APPARATUS FOR CONTROLLING THE FREQUENCY OF A VARIABLE FREQUENCY MAGNETRON

Original Filed June 22, 1956

N. E. BACKMARK
*Inventor*
by Michael S. Striker

United States Patent Office 3,168,712

Patented Feb. 2, 1965

3,168,712

APPARATUS FOR CONTROLLING THE FREQUENCY OF A VARIABLE FREQUENCY MAGNETRON

Nils Erik Backmark, Enskede, Sweden, assignor, by mesne assignments, to North American Philips Company, Inc., New York, N.Y., a corporation of Delaware Continuation of application Ser. No. 593,192, June 22, 1956. This application May 18, 1961, Ser. No. 116,638
Claims priority, application Sweden, June 23, 1955, 5,917/55; Mar. 6, 1956, 2,176/56
4 Claims. (Cl. 331—87)

This application is a continuation of my previous application Serial No. 593,192, filed June 22, 1956, for "Circuits for Switching Generators of High-Frequency Energy," now abandoned.

The present invention relates to improvements in or relating to circuits for controlling a generator or transmitter of high frequency energy and more specifically to a high frequency generating device comprising a generator of variable frequency provided with tuning means in which the generator is automatically switched on for delivering e.g. via an antenna high frequency energy at a predetermined ratio between a comparison frequency obtained from a frequency determining circuit source as for instance a high frequency signal source and a frequency to which the generator is being tuned.

In a circuit according to the invention the generator is provided with means for variation of its resonant frequency. Said variation means is arranged so as to continuously vary the tuning of the generator, and the generator instantaneously switched on for delivering a high frequency energy impulse at the instant at which said predetermined ratio is established between the frequency of a signal source, the control or comparison frequency, and the frequency to which the generator is tuned at said instant.

This predetermined ratio may for instance be essentially 1:1, the generator then transmitting an oscillation with the same frequency as the frequency of the signal source. Said ratio may, however, be set at any desired value obtained for instance by modulation of the control frequency with a suitable frequency.

Thus the invention relates to a device for frequency control of a generator for the generation of electrical oscillations in the form of pulses of high frequency energy, provided with means for continuously varying the frequency to which the generator is tuned by variation of a tuning means in the generator, said frequency control device being characterized in that it comprises a comparator device for comparing the frequency to which the tuning means of the generator is tuned with the frequency of a frequency determining device, said comparator device being arranged for delivering a signal when a predetermined relation between said two frequencies is established, and further a triggering means which responds to said signal delivered by the comparator device by switching on the generator so that it delivers an impulse of high frequency energy to its energy delivering means, at a frequency determined by said predetermined relation between said two frequencies.

The switching-on of the oscillator for energy delivery is effected upon said predetermined frequency coincidence by said triggering means controlled by a comparator device.

The means for switching-on the high frequency oscillation generator for energy delivery is thus arranged to switch the generator intermittently, so that the generator may generate an impulse of high frequency energy each time the varying resonant frequency of the generator tuning means passes the frequency at which said predetermined frequency relation is present.

In a simple embodiment of the invention the generator consists of an oscillator in which in a manner known per se the oscillating circuit is provided with tuning means, by which the resonance frequency of the generator oscillating circuit is varied. These tuning means are arranged so that the oscillating circuit undergoes a continuous frequency variation, for instance a sine-shaped variation, the comparator device for effecting comparison between the comparison frequency and the resonant frequency of the generator being arranged so as to generate a signal for switching-on the generator for energy deliver at or near the instant of frequency coincidence to generate a high frequency impulse having the frequency of the oscillating circuit at the instant of switching, the frequency of said high frequency impulse thus corresponding to the frequency of said frequency determined device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which:

Figure 1:
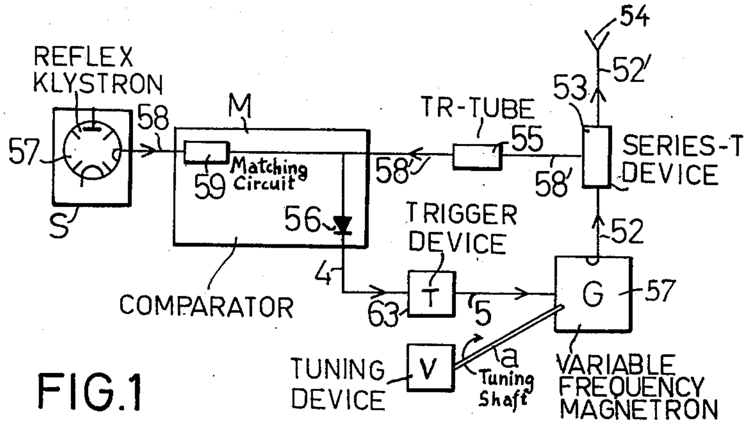
FIG. 1 is a block diagram of an embodiment of the invention.

The circuits and devices represented by the blocks shown in the drawing are all well known per se and choice of suitable circuits for different applications will be easy for the man skilled in the art.

In the drawing, G represents a high frequency generator comprising an oscillator with tuning means therein determining the frequency of a signal delivered by the generator when switched-on for energy delivery. The switching-on of the generator is effected, in any suitable manner, by means of a signal introduced over a conductor 5, the generator then delivering a high frequency oscillation having a frequency determined by said tuning means. The tuning means of the generator is connected to a tuning device V for varying the resonance frequency of the tuning means of the generator G. The device V may be a purely mechanical one and act on the tuning means, for instance a capacitor arrangement of the generator, or electrical. Such mechanical and electrical means for varying the frequency of an oscillating circuit are well known per se and need not be described in detail in this connection. One arrangement for bringing about such a variation of the resonance frequency of an oscillator for high frequency is subject of the U.S. Patent No. 2,931,943.

In the figures it is intimated that the variation of the tuning of the generator G is brought about in a manner well known per se by means of a shaft *a*, which is operatively coupled to the tuning means of the generator, the device V for instance being a motor operating a tuning means of the generator G. The arrangement may as an example be such that the variation of the resonance frequency of the generator tuning means is a sine-shaped or other periodic variation.

Figure 2:
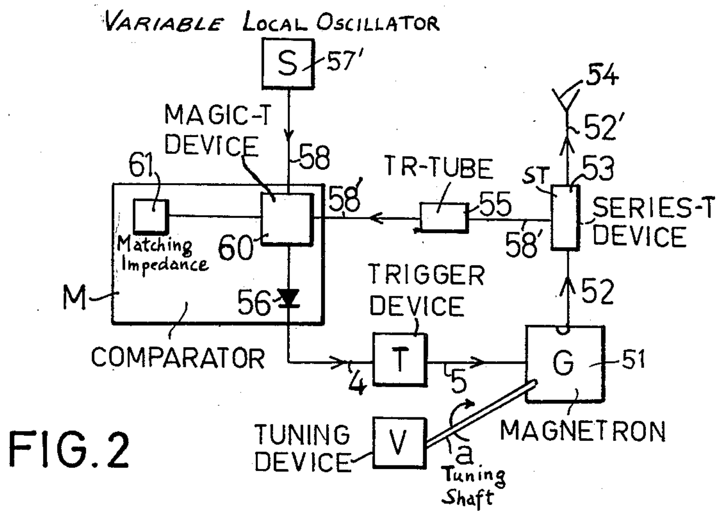
FIG. 2 is a block diagram of a second embodiment of the invention.

The devices according to FIGS. 1 and 2 of the drawing is further provided with a tunable signal voltage source S, arranged to deliver a signal of a desired frequency which shall be determining for the frequency at which the generator G transmits energy over the output lead 52, 52′. This signal voltage source S is a local oscillator.

The signal voltage source S is connected to a frequency comparator device M over a conductor 58 and delivers an oscillation of a certain selected frequency, the comparison frequency, to said comparator device M via this conductor. The comparator device M is arranged so as to compare the comparison frequency conveyed to the device M over the conductor 58 from the signal voltage source S with the frequency to which the tuning means of the generator G is tuned. The comparator device M is arranged so that, in a manner well known for frequency comparising apparatuses, a signal is delivered via an output conductor 4 from the comparator device M in the case of a certain coincidence or ratio between the comparison frequency and the variable resonance frequency of the generator tuning means, said signal appearing on the conductor 4 being applied to a triggering means for the generator, the trigger device T, which, when receiving such signal over conductor 4 from the comparator device, switches the generator for delivering energy, by means of a trigger signal over lead 5, so that the generator delivers energy over the output lead 52. The bringing into delivery operation of the generator may obviously be effected in any manner of which many are well known to the art, the triggering device T being such that it brings the generator to generate a high frequency signal to output 52, 52', for a predetermined impulse time period, irrespective of the duration of the signal over the lead 4, so that the generator only transmits a pulse each time the tuning means of the oscillator G under the influence of the tuning device V is tuned to a frequency of a predetermined frequency ratio to, for instance coincidence with, the comparison frequency from the signal voltage source S.

If the generator G, under the influence of the device V, undergoes a resonance frequency variation of a sine-shaped form in the frequency range within which frequency coincidence with the comparison frequency of the signal voltage source may be obtained, two triggerings of the generator G will normally be obtained for each frequency variation period. Obviously it is easy for the man skilled in the art to arrange for a suppression of each second of said signals obtained over lead 4 to the triggering device, so that only one pulse is transmitted by the generator G for each period of the frequency variation. Such means for suppressing each second pulse are well known per se.

In case of a predetermined frequency ratio including frequency coincidence between the comparsion signal from the signal voltage source S over lead 58 to the comparator device M and said resonance frequency of the generator, the generator G is switched on in the manner described above by the triggering means T.

The resonant circuit of the generator G, for instance consisting of a variable frequency magnetron as described in the U.S. Patent No. 2,931,943, is connected to an antenna 54 via the output lead 52, for instance a wave guide, comprising a series-T 53 terminating in a lead 52'. In one branch 58' of said series-T, said branch leading to the comparator device M, a TR-tube 55 is arranged in order to prevent energy from the generator, when switched-on for delivering an impulse of high frequency transmitter energy, to enter the circuit connected to the generator output leads via the TR-tube. In the embodiment illustrated in FIG. 1 of the drawing the output circuit of the frequency determining signal voltage source S, for instance a tunable reflex klystron 57, is connected via a lead 58 to the comparator device M, the klystron 57 being coupled via a matching circuit 59 of the comparator device in such a manner that the output from the klystron as appearing on lead 58' is greatly dependent on the load impedance sensed on lead 58, and being essentially depending on the impedance of the tuning means of the generator G. It will be appreciated by those skilled the art that the circuit of the comparator device M may easily be designed so that, in an output circuit thereof, a signal is obtained as soon as the tuning means of the generator, constituting the load impedance on the transmission line from the klystron and comprising the matching circuit 59, is near to or in resonance with the klystron frequency. For instance, the circuit may be so designed that for large standing waves in the transmission line, lead 58', from the klystron to the generator output circuit it will deliver very low or no output from a detector means, for instance a rectifier crystal 56, connected to a junction point between lead 58' and a lead from the matching circuit 59, if the resonance frequency of the resonant circuit of the generator G is out of resonance with the klystron frequency. The output of the detector means is connected to a generator triggering means 63. As the resonance frequency of generator G under the influence of the frequency variation or tuning device V approaches the klystron frequency, the impedance to the generator oscillating circuit constituting the load on the klystron and sensed via the TR-tube 55 and the series-T 53 will approach a value which for frequency coincidence nearly coincides with matching. In this position an increase in the output of the comparison signal delivered from the klystron will be obtained and consequently an increase in current through the rectifier crystal 56. In, or in the vicinity of, the condition when the resonance frequency of the generator tuning means passes, during its being periodically tuned within limits, the frequency of the signal delivered by the klystron, the comparator device, comprising the crystal 56, will thus give rise to a pulse, which causes the triggering means 63 to switch the generator G into operation for transmitting a signal impulse over lead 52, the series-T 53 and lead 52' to the antenna 54, the TR-tube 55 during this transmitted pulse preventing energy to pass from the switched-on generator to the comparator circuit connected thereto via the TR-tube.

Referring now to the embodiment illustrated in FIG. 2, the measuring device M as shown therein comprises a so-called magic-T 60 to which the wave guide 58' from the generator G output circuit is connected in the same manner as illustrated in FIG. 1 via a series-T 53 and a TR-tube 55. An opposite branch of the magic-T 60 is connected to a termination impedance 61 and the input branch 62 of the magic-T is connected to a signal voltage source S, as before for instance a reflex klystron. The fourth branch of the magic-T is connected to the triggering means 63 via a crystal 56. For frequency coincidence between the frequency determining voltage source 57 and the resonance frequency of the tuning means of the generator G, a dip in the output current from the measuring device, i.e. from the indicator rectifier 56, occurs, said dip in output current being utilized for actuating the triggering means 63 for switching-on the generator G to deliver a high frequency impulse. The device according to the invention operates in the following way: The magnetron G is normally nonoscillating and consequently a completely passive element. The tuning device V is continuously rotating the shaft *a* and actuating the variable resonator system of the magnetron G in order to continuously vary the resonance frequency of the resonator system and consequently the oscillation frequency of the magnetron within a predetermined frequency range. The local oscillator S consisting, for instance, of a reference klystron, is continuously generating a high frequency signal of a predetermined frequency within said frequency range. This signal is supplied to one branch of the magic-T-junction 60. The energy of this signal is divided between the matching impedance 61 and the transmission line 58', while substantially no portion of the signal is entering the detector crystal 56. The portion of the signal energy leaving the magic-T-junction element through the transmission line 58' will pass through the TR tube 55 and the series-T-junction element 53 to the resonator system of the magnetron G. In this resonator system a certain portion of the signal energy will be reflected back through the series-T-junction element and the TR tube to the magic-T-junction element. The amount of reflected energy will depend on the reflection factor of the resonator system of the magnetron for the frequency of the energy, i.e.

for the frequency of the signal produced by the local oscillator. The reflection factor of the resonator system for this frequency will vary in correspondence with the variation of the resonance frequency of the resonator system. When the resonance frequency of the resonator system coincides with the frequency of the signal from the local oscillator the reflection factor of the resonator system will be minimum and substantially no energy will be reflected back from the resonator system to the magic-T-junction element. The energy reflected from the resonator system of the magnetron to the magic-T-junction element will be divided between the branch leading to the local oscillator and the branch leading to the detector crystal 56, while substantially no portion of this reflected energy will be passed to the matching impedance 61. The detector crystal 56 will consequently measure the amount of reflected energy from the resonator system of the magnetron G. When the resonance frequency of the resonator system coincides with the frequency of the signal from the local oscillator, a pronounced dip will consequently appear in the voltage supplied to the detector crystal 56. A corresponding pronounced dip will consequently appear in the D.C. control voltage supplied from the detector crystal 56 to the trigger circuit T. This dip is used as a control or sync pulse for the triggering device and will actuate this triggering device to trigger the magnetron to start to oscillate and generate a pulse of high frequency energy through the series-T-junction element to the transmitting antenna 52'. As described above the TR tube will automatically disconnect the comparator and the local oscillator from the magnetron, when the magnetron is oscillating. In this way the magnetron will generate pulses of high frequency energy of a frequency coinciding with or having a predetermined ratio to the frequency of the local oscillator in the device.

It will be understood that each of the elements described above, or two or more together, may also find a useful application in other types of arrangement for controlling a high-frequency generator differing from the types described above.

While the invention has been illustrated and described as embodied in arrangement for controlling a high-frequency generator of variable frequency, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for transmitting pulses of high frequency energy of predetermined frequency within a predetermined frequency range, comprising, in combination, normally non-oscillating magnetron means activatable to oscillate and generate high frequency energy, including a variable resonator system for determining the oscillation frequency of said magnetron means within said frequency range;

actuating means for actuating said resonator system for continuously varying said oscillation frequency within said frequency range;

local oscillator means for generating a signal of a predetermined frequency within said frequency range and having output means for said signal;

a transmission line between said resonator system and said local oscillator means for connecting said resonator system as a passive load to said output means of said local oscillator means;

high frequency energy detector means connected to said transmission line at a point between said resonator system and said local oscillator means for detecting the amount of energy of said signal reflected from said resonator system and for producing a control pulse in response to a pronounced change in said amount of reflected energy, when the resonance frequency of said resonator system coincides with said predetermined frequency of said signal; and triggering means connected between said magnetron means and said detector means for activating said magnetron means to oscillate and generate a pulse of high frequency energy, when said control pulse from said detector means is received by said triggering means.

2. An apparatus as defined in claim 1, comprising unidirectional transmission junction means connecting said detector means to said transmission line for leading a substantial portion of said energy reflected by said resonator system to said detector means and for substantially preventing said signal generated by said local oscillator means from directly entering said detector means.

3. An apparatus as defined in claim 1, comprising a magic-T-junction element in said transmission line, said magic-T-junction element having four branches, two opposite branches of said four branches being connected to said local oscillator means through a portion of said transmission line and to said detector means, respectively, and the two remaining opposite branches of said four branches being connected to said resonator system through another portion of said transmission line and to a matching impedance, respectively.

4. An apparatus as defined in claim 1, wherein said local oscillator means is tunable within said predetermined frequency range.

References Cited in the file of this patent

UNITED STATES PATENTS 2,708,749 Schmitt ---------------- May 17, 1949